F. F. LANDIS.
MOLD.
APPLICATION FILED JAN. 6, 1915.
1,154,255.
Patented Sept. 21, 1915.
2 SHEETS—SHEET 1.
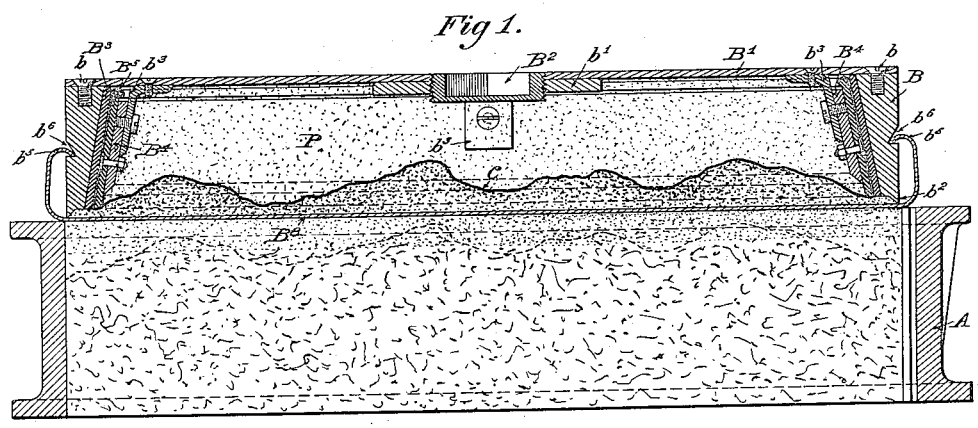
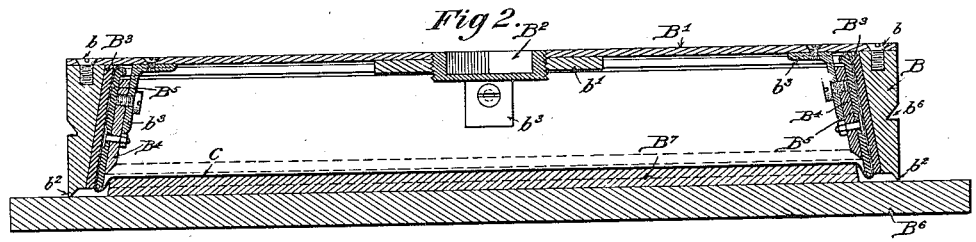
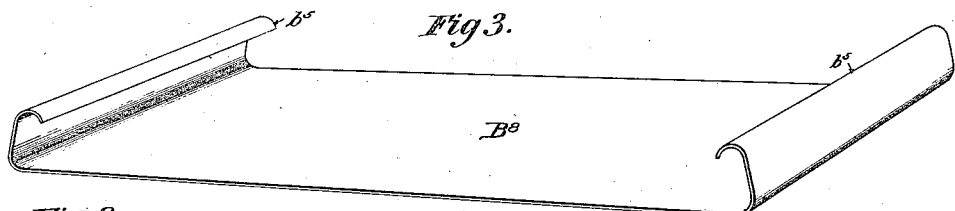
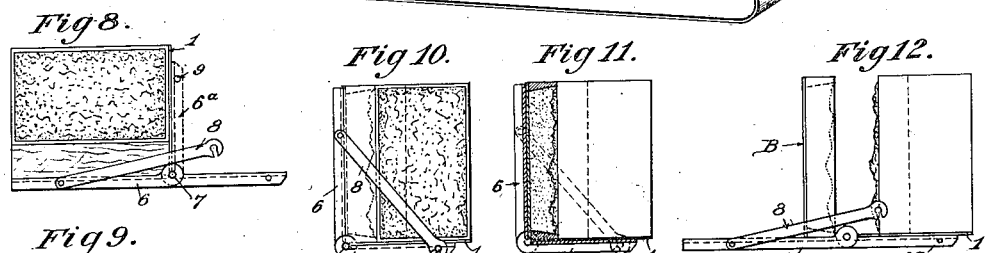
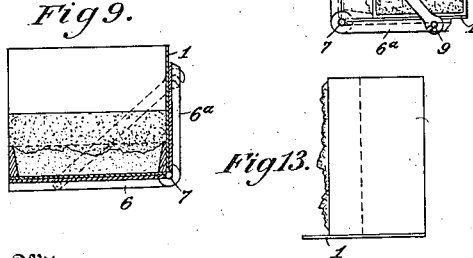
Inventor
Frank F. Landis,
By
E. W. Bradford
Attorney
Witnesses

F. F. LANDIS.
MOLD.
APPLICATION FILED JAN. 6, 1915.

1,154,255.

Patented Sept. 21, 1915.
2 SHEETS—SHEET 2.

Witnesses

Inventor
Frank F. Landis,
By
Attorney

UNITED STATES PATENT OFFICE.

FRANK F. LANDIS, OF WAYNESBORO, PENNSYLVANIA.

MOLD.

1,154,255.  Specification of Letters Patent.  Patented Sept. 21, 1915.

Application filed January 6, 1915. Serial No. 879.

*To all whom it may concern:*

Be it known that I, FRANK F. LANDIS, a citizen of the United States, residing at Waynesboro, Franklin county, and State of Pennsylvania, have invented and discovered certain new and useful Improvements in Molds, of which the following is a specification.

My present invention relates to improvements in the art of forming and handling all kinds of concrete building blocks from what is known as "dry" or "medium" mixtures and to form such blocks from said mixtures, remove them from the mold and uniformly support the same upon a curing plate or pallet and place them upon a curing floor, without in the least shifting any of the particles, which greatly weakens or impairs the strength of such blocks where any disturbance or shifts occur immediately after molding, and is the major difficulty experienced in forming concrete products from the said "dry" or "medium" mixtures. My method also enables the block or product to be placed upon a curing plate or pallet in the same position in which it is finally placed in the wall, which also avoids the discoloring or disfiguring of its face, as is the case when the face of a block is placed adjacent to said plate while hardening.

Figure 4:
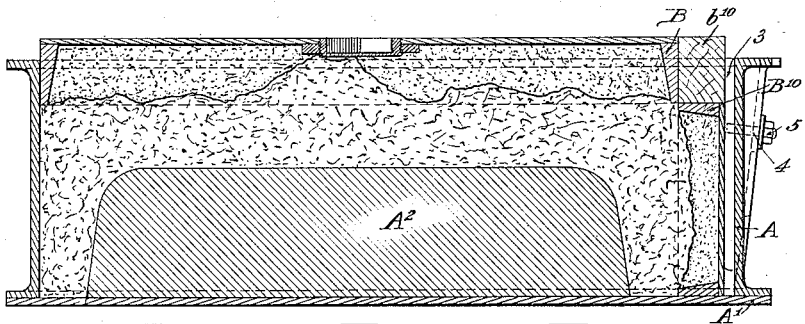
Figure 5:
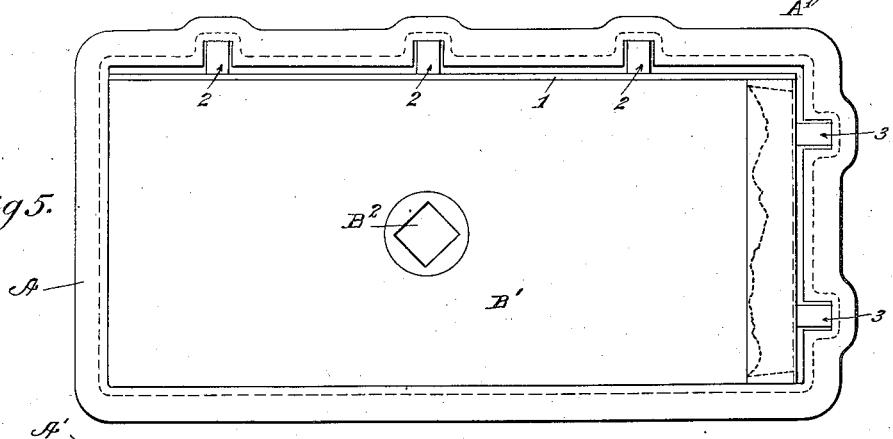
Figure 6:
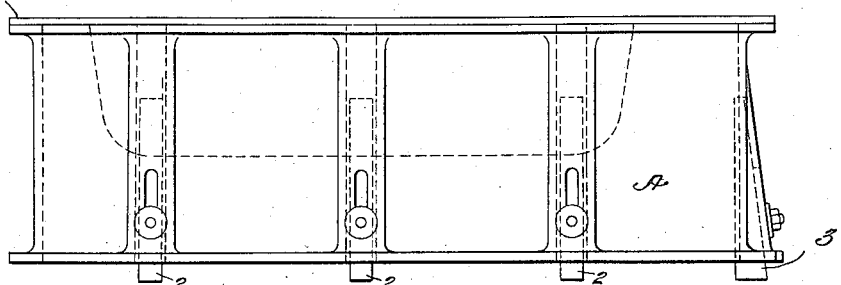
Figure 7:
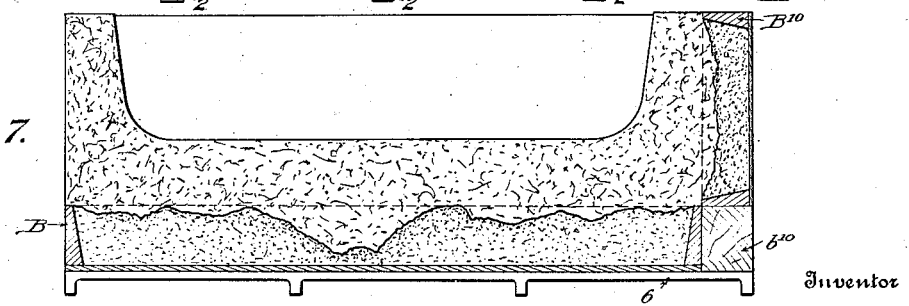

Referring to the accompanying drawings which are made a part hereof and on which similar reference characters indicate similar parts, Figure 1 is a central vertical section through a mold with a matrix in the position it occupies before the mold is placed in the press, Fig. 2 a similar view through a matrix box employing a flexible matrix in the position it occupies when ready to be filled with the plastic material, Fig. 3 a perspective view of a metal plate designed to cover the matrix while the same is being placed in position as shown in Fig. 1, Fig. 4 a view similar to Fig. 1, showing a matrix in the mold in the position it occupies after the block has been pressed, Fig. 5 a top view or plan view of the mold shown in Figs. 1 and 4, Fig. 6 a side elevation thereof with the mold upside down, Fig. 7 a view of the block removed from the mold with its front face and one end each in the matrix, and Figs. 8 to 14 end elevations of the block in connection with the curing plate or pallet and devices for handling same for the purpose of placing it in curing position, as will be presently more fully described.

In said drawings the portions marked A represent the mold proper, and B a matrix, which may be of any design or character.

The mold A consists of a suitable casing of the desired form and construction for the particular character of block to be molded and may have a bottom $A^1$ with a core $A^2$ of the form required to give the desired form to the block to be molded.

The matrix, as shown in the drawing, consists of a box B of a size which will permit it to slide within the mold A and consists of sides preferably formed tapered on the inside, as shown, and provided with a bottom $B^1$ which may be integral with the sides or secured by screws $b$ countersunk to be flush with said bottom, in which is provided one or more filling holes which are closed by a threaded plug or plugs $B^2$, which have angular sockets in their outer faces to receive a wrench. The outer edges of said box B are preferably formed tapered at $b^2$ to form a beveled edge around the face of the block. The inside faces of said box may be lined with a rubber sheet $B^3$, riveted, cemented, or otherwise secured in place. A frame $B^4$ corresponding in form to the inside of said box but having its outside face also covered with a rubber sheet $B^5$, is mounted within said box, being secured therein by brackets $b^3$ attached to said frame and to the bottom $B^1$ of the matrix box. Said rubber sheet $B^5$ is somewhat wider than the frame $B^4$ and extends beyond both its edges.

The sheet C is preferably of rubber, or other suitable material, and extends between the rubber sheets $B^3$ and $B^5$, its extreme edges being preferably turned over the edge of sheet $B^5$ next to the bottom of the matrix box and secured thereto in any suitable manner. Said flexible sheet is thus secured with the frame $B^4$ and rubber sheet $B^5$ and may be removed from the matrix box by removing the screws which secure the brackets $b^3$ to the bottom $B^1$. A ready means for renewing this flexible sheet is thus provided. By reasons of the rubber sheet $B^5$ extending beyond the edge of the frame $B^4$, said rubber sheet C is prevented from being pressed against or coming in contact with the frame $B^4$ and thus saved from being cut or unduly worn in use.

The plastic material P forming the backing for the flexible face of the matrix is of said or similar "shiftable" material which can be shifted to change the contour of the matrix from time to time.

The above is a detailed description of a matrix for producing varied outlines, the various applications of which have been described in a former application for patent.

The operation required in the use of a matrix of the character above described is as follows: The matrix being formed and the parts adjusted as shown and described, the box is filled with shiftable material P through the hole filled by the plug $B^2$. The sheet C is then manipulated to form such a face or surface as may be desired for the form of the face of the block by depressing it at different points by hand or any suitable tools, the material P being yieldable and shifting around as the flexible sheet is manipulated until the form desired is secured. Before placing the matrix in position shown in Fig. 1 the depressions in same are filled with concrete of the mixture which is to form the face of the block and is stroked off even and the plate $B^8$ placed thereon to retain said concrete. Said plate is preferably of thin metal, in this case is formed with curved sides having lips $b^5$ adapted to engage with notches $b^6$ along the entire length of said matrix box. The mold A is filled to near its top with coarse concrete from which the block is to be formed and then its top is covered with a fine or "rich" concrete corresponding to the mixture between the plate $B^8$ and the face of the matrix. Said mold is then stroked off and the matrix box placed in position, as shown in Fig. 1, when the metal cover $B^8$ is removed by being slid from between the mold and matrix, which brings the concrete in the top of the mold and that in the adjacent face of the matrix together. The mold is then placed in the press and the matrix box pressed into the mold to a point as indicated in Fig. 4 and by dotted line in Fig. 1, which serves to press the block and at the same time form its face to correspond with the design of said matrix.

In the construction of molds shown in Figs. 4, 5, and 6 and in the illustrations in Figs. 7 to 14, I have shown an advantageous construction for use in formation of a block, which embodies the use of a curing plate as one side of the mold, and shows a means of handling the block which enables it to be handled without danger of cracking or breaking, as will be presently more fully described. The Figs. 4 to 7 also show a mold designed for forming corner blocks, where an outer face is also to be formed upon its end.

In addition to the matrix B, I have shown a similar matrix $B^{10}$ to form such end, the same being of a suitable size for the purpose, and inserted in the mold at one end thereof. A block $b^{10}$ is mounted upon the upper edge of said matrix $B^{10}$ to fill the space from the top edge thereof to the top of the mold casing and serves as the inside face of said mold at this end above said matrix so that when the matrix B has been pressed into said mold, as indicated in Fig. 4, the corner of the concrete block will be formed square as indicated. A curing plate 1 is inserted within the mold along one side thereof and is supported by a series of wedges 2 which are inserted in vertical pockets formed in the side of the mold casing. Similar wedges 3 are mounted in similar pockets in the end of the mold casing and support the matrix $B^{10}$ in position. Each of said wedges has a pin 4 tapped therein with a nut 5 upon its outer end, each pin projecting through a vertical slot in the side of the pockets in which it is mounted. By means of said wedges with their pins 4 resting against the opposite ends of the slots from the position shown in Fig. 6, the position of the curing plate 1 and matrix $B^{10}$ are exactly determined, to form the block of the exact size desired. I am also enabled by this arrangement to form the ends and sides of the block perfectly square and at right angles to each other and avoid the necessity of having the mold formed with a draft, as is required in solid mold construction to enable it to be removed from the block. By turning the mold upside down as shown in Fig. 6, the wedges fall down, which causes them to recede from the outer faces of the curing plate and the end matrix $B^{10}$, loosening the mold upon the block sufficiently to permit it to be lifted therefrom. When the mold is turned upside down for this purpose, it is placed upon one part of a two part canting plate 6 and the mold then lifted from the block, leaving said block and the matrix boxes B and $B^{10}$ and curing plate 1, as shown in Figs. 7 to 11. The canting plate 6 consists of two parts hinged at 7. The block being placed upon one side of said canting plate as shown in Fig. 7, the other part $6^a$ is turned upon the hinge 7 into a right angular position against the side of the block having the curing plate 1 thereon, and is secured by a brace 8 hinged to one part and engaging with a pin 9 projecting from the end of the other part. The block is then turned from the position resting on its face, as shown in Figs. 7 and 8 to the position resting on its side on the curing plate 1, as shown in Figs. 10 and 11, which brings the block upon the side upon which it will rest in use. The brace 8 is unfastened and the canting plate 6 straightened as shown in Fig. 12 when the matrix boxes B and $B^{10}$ are removed from the face of the block and said block resting on plate 1 is placed upon the curing floor to harden, as indicated in Figs. 13 and 14. By this arrangement the block is easily and conveniently molded without danger of breaking or twisting and is allowed to cure upon its side and in the position it will occupy when in use, and the best results are thus secured.

While I have shown and described a box containing a flexible and changeable matrix, and in Fig. 2 have illustrated how said box may be filled with plastic material before the face of the matrix is shaped, I do not desire to be understood as limiting myself to any special form of matrix as my invention consists in the method and means whereby the block may be molded and handled front face up with the curing plate against its base or bottom so that the block may remain undisturbed in said position on said curing plate until hard enough to be handled or placed in a wall, regardless of the character of matrix employed.

Having thus fully described my said invention, what I claim as new and desire to secure by Letters Patent, is:

1. The combination, with a mold, of a matrix comprising a box containing shiftable material, the inner sides of said box having soft material upon their faces, a frame within said box having a soft material upon its outside faces, and a flexible sheet clamped between the soft faces of the box and frame, substantially as set forth.

2. The combination, with a mold, of a matrix comprising a box, a flexible sheet secured within the box to cover the face of the matrix, and a removable cover for the top of said box for securing the material therein during the reversing of the position of said matrix, substantially as set forth.

3. The combination, of a mold having a matrix, and a curing plate both supported by means of slidable wedges, substantially as set forth.

4. The combination, in a mold, of a curing plate supported in one side thereof by means of wedges, a matrix for forming the face of the block, and means for handling the block after the mold is removed therefrom, consisting of a jointed plate upon which the face of the block covered by the matrix may be placed, and after the mold is removed the other side of said plate may be turned against the curing plate on the side of the block and said block turned on to said curing plate and the matrix then removed from the face to enable said block to cure upon its side, substantially as set forth.

5. In a mold for forming concrete blocks, the combination, of the main mold box for containing the bulk of the concrete mixture, a box for containing the matrix and the mixture for the face of the block, and a thin plate fitted to cover said matrix box and retain said mixture for the face of the block while said matrix box is being placed in position on the top of said mold, said plate adapted to be removed after said matrix has been placed in position, substantially as set forth.

6. In a mold for forming concrete blocks, the combination, of the main mold box for containing the mixture from which the block is to be formed, the matrix box for shaping the face of said block and adapted to contain the mixture to form said face, and a removable plate adapted to cover said matrix box, substantially as described and for the purposes set forth.

7. A matrix box for molds formed to hold the material for the face of the product and provided with a removable cover to retain said material while said box is being placed in position, substantially as set forth.

8. A mold for forming concrete blocks comprising a main box, a matrix box, at one side thereof a curing plate adjacent to the base side of the block, and sliding wedges for retaining the matrix and curing plate in fixed and squared position, substantially as set forth.

9. In a mold for forming concrete blocks, the combination of the main box, the matrix box, a removable cover for said matrix box, the curing plate arranged in said main box at right angles to said matrix, and wedge-shaped supports for said matrix and curing plate, whereby said blocks may be molded with perfectly squared sides, substantially as set forth.

In witness whereof, I have hereunto set my hand and seal at Waynesboro, Pennsylvania this 15th day of December, A. D. nineteen hundred and fourteen.

FRANK F. LANDIS. [L. S.]

Witnesses:
M. H. LANDIS,
ALF. N. RUSSELL.